United States Patent
Chen et al.

(10) Patent No.: US 11,791,721 B2
(45) Date of Patent: Oct. 17, 2023

(54) MULTI-MODE DC-TO-DC POWER CONVERTER

(71) Applicant: Qualcomm Incorporated, San Diego, CA (US)

(72) Inventors: Jiwei Chen, Fremont, CA (US); Guoyong Guo, San Jose, CA (US); Yue Jing, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 367 days.

(21) Appl. No.: 16/778,697

(22) Filed: Jan. 31, 2020

(65) Prior Publication Data

US 2021/0242771 A1    Aug. 5, 2021

(51) Int. Cl.
| | |
|---|---|
| G06F 1/00 | (2006.01) |
| H02M 3/07 | (2006.01) |
| G06F 1/26 | (2006.01) |
| H02J 7/00 | (2006.01) |

(52) U.S. Cl.
CPC .............. *H02M 3/07* (2013.01); *G06F 1/263* (2013.01); *H02J 7/007* (2013.01); *H02J 7/0068* (2013.01); *H02J 2207/20* (2020.01)

(58) Field of Classification Search
CPC .......... H02M 3/07; H02M 3/072; H02M 1/36; H02M 3/158; G06F 1/263; H02J 7/0068; H02J 7/007; H02J 2207/20

See application file for complete search history.

(56) References Cited

U.S. PATENT DOCUMENTS

| | | | |
|---|---|---|---|
| 2008/0036529 A1* | 2/2008 | Ishiyama | H02M 3/07 327/536 |
| 2016/0190921 A1 | 6/2016 | Kumar et al. | |
| 2016/0254689 A1 | 9/2016 | Lee et al. | |
| 2017/0279356 A1 | 9/2017 | Kihara et al. | |
| 2018/0115157 A1 | 4/2018 | Chan et al. | |

OTHER PUBLICATIONS

International Search Report and Written Opinion—PCT/US2021/015836—ISA/EPO—dated Apr. 30, 2021.

* cited by examiner

*Primary Examiner* — Xuxing Chen
(74) *Attorney, Agent, or Firm* — Gerald P. Joyce, III.

(57) ABSTRACT

An apparatus is disclosed for implementing a multi-mode direct-current (DC)-to-DC power converter. In an example aspect, the apparatus includes a DC-to-DC power converter with a flying capacitor, an inductor, and four switches. The inductor is coupled between a second node and a battery node. A first switch is coupled between a first node and a first terminal of the flying capacitor. A second switch is coupled between the first terminal and the second node. A third switch is coupled between a second terminal of the flying capacitor and the second node. A fourth switch is coupled between the second terminal and a ground node. The DC-to-DC power converter is configured to selectively transfer power from the first node to the battery node according to a first operational mode and transfer other power from the battery node to the first node according to a second operational mode.

11 Claims, 8 Drawing Sheets

MULTI-MODE DC-TO-DC POWER CONVERTER

TECHNICAL FIELD

This disclosure relates generally to power transfer and, more specifically, to a direct-current (DC)-to-DC power converter that can selectively provide multi-mode charging, such as forward charging or reverse charging.

BACKGROUND

Batteries are reliable, portable energy sources that are used by a wide range of electronic devices including mobile phones, laptops, toys, power tools, medical device implants, electronic vehicles, and satellites. A battery, however, stores a fixed amount of charge that is depleted during mobile operation of the electronic device. Instead of requiring the purchase of a replacement, many batteries are rechargeable via another power source. The same battery can therefore be used multiple times.

An electronic device can include a power converter to provide a particular voltage or current for charging the battery. Different types of power converters can be designed to perform under different operating conditions. For example, some power converters can be used to transfer power from a power source to a battery while others can be used to transfer power from the battery to the load. Such power converters can also be designed to operate at different efficiencies and duty cycles. To enable the electronic device to support multiple operational modes for transferring power, some techniques may implement multiple power converters within the electronic device and then enable an appropriate power converter according to a current operational mode. Including multiple power converters can, however, increase a size and cost of the electronic device.

SUMMARY

Apparatuses and techniques are disclosed that implement a multi-mode direct-current (DC)-to-DC power converter. The multi-mode DC-to-DC power converter can selectively operate in a forward-charging operational mode to transfer power from a power source to a battery or in a reverse-charging operational mode to transfer power from the battery to a load. In particular, the multi-mode DC-to-DC power converter selectively operates as a three-level buck converter according to a first forward-charging operational mode or as a two-level boost converter according to a reverse-charging operational mode. In some cases, the DC-to-DC power converter can also selectively operate as a divide-by-two charge pump according to a second forward-charging operational mode.

During the reverse-charging operational mode, the DC-to-DC power converter can operate in a soft-start state or a steady state. During the soft-start state, the DC-to-DC power converter gradually adjusts a voltage across a flying capacitor while one or both terminals of the flying capacitor are disconnected from other components of the DC-to-DC power converter. During the soft-start state, the voltage across the flying capacitor is adjusted to be within a threshold voltage of a voltage provided to the load. By gradually adjusting the voltage across the flying capacitor, large transient currents can be avoided when transitioning between one of the forward-charging operational modes and the reverse-charging operational mode. These large transient currents could otherwise damage one or more of the switches within the DC-to-DC power converter. When the voltage across the flying capacitor is within the threshold voltage, the DC-to-DC power converter operates in the steady state. In the steady state, the flying capacitor is connected between the load and a ground. This improves efficiency, reduces the ripple across the voltage provided at the load, and reduces variations in the voltage at the load in response to transient events.

In an example aspect, an apparatus is disclosed. The apparatus includes a DC-to-DC power converter with a first node, a second node, a battery node, and a ground node. The DC-to-DC power converter also includes a flying capacitor, an inductor, a first switch, a second switch, a third switch, and a fourth switch. The flying capacitor has a first terminal and a second terminal. The inductor is coupled between the second node and the battery node. The first switch is coupled between the first node and the first terminal of the flying capacitor. The second switch is coupled between the first terminal of the flying capacitor and the second node. The third switch is coupled between the second terminal of the flying capacitor and the second node. The fourth switch is coupled between the second terminal of the flying capacitor and the ground node. The DC-to-DC power converter is configured to selectively transfer power from the first node to the battery node according to a first operational mode and transfer other power from the battery node to the first node according to a second operational mode.

In an example aspect, an apparatus is disclosed. The apparatus includes a first node and a battery node. The first node is configured to selectively couple to a power source or a load. The battery node is configured to be coupled to a battery. The apparatus also includes direct-current (DC)-to-DC power conversion means for selectively operating as a three-level buck converter to transfer power from the first node to the battery node and as a two-level boost converter to transfer other power from the battery node to the first node.

In an example aspect, a method for operating a DC-to-DC power converter is disclosed. The method includes connecting a first node of the DC-to-DC power converter to a power source. The method also includes operating the DC-to-DC power converter as a three-level buck converter according to a first operational mode. The method additionally includes transferring power from the power source to a battery responsive to the DC-to-DC power converter operating as the three-level buck converter. The method includes connecting the first node of the DC-to-DC power converter to an external load. The method also includes operating the DC-to-DC power converter as a two-level boost converter according to a second operational mode. The method additionally includes transferring other power from the battery to the external load responsive to the DC-to-DC power converter operating as the two-level boost converter.

In an example aspect, an apparatus is disclosed. The apparatus includes a first power path, a second power path, a battery, a switching circuit, and a DC-to-DC power converter. The first power path is configured to be connected to a power source. The second power path is configured to be connected to an external load. The switching circuit is coupled between the first power path, the second power path, and a first node. The switching circuit is configured to selectively connect the first node to the first power path and connect the first node to the second power path. The DC-to-DC power converter comprises the first node and a battery node coupled to the battery. The DC-to-DC power converter is configured to selectively operate as a three-level buck converter to transfer power from the first power path to the battery according to a first operational mode and operate as a two-level boost converter to transfer other power from the battery to the second power path according to a second operational mode.

DETAILED DESCRIPTION

An electronic device can include a power converter to provide a particular voltage or current for charging the battery. Different types of power converters can be designed to perform under different operating conditions. For example, some power converters can be used to transfer power from a power source to a battery while others can be used to transfer power from the battery to the load. These power converters can also be designed to operate at different efficiencies and duty cycles. To enable the electronic device to support multiple operational modes for transferring power, some techniques may implement multiple power converters within the electronic device and then enable an appropriate power converter according to a current operational mode. Including multiple power converters can, however, increase a size and cost of the electronic device.

To address this issue, apparatuses and techniques are disclosed that implement a multi-mode direct-current (DC)-to-DC power converter. The multi-mode DC-to-DC power converter can selectively operate in a forward-charging operational mode to transfer power from a power source to a battery or in a reverse-charging operational mode to transfer power from the battery to a load. In particular, the multi-mode DC-to-DC power converter selectively operates as a three-level buck converter according to a first forward-charging operational mode or as a two-level boost converter according to a reverse-charging operational mode. In some cases, the DC-to-DC power converter can also selectively operate as a divide-by-two charge pump according to a second forward-charging operational mode.

During the reverse-charging operational mode, the DC-to-DC power converter can operate in a soft-start state or a steady state. During the soft-start state, the DC-to-DC power converter gradually adjusts a voltage across a flying capacitor while one or both terminals of the flying capacitor are disconnected from other components of the DC-to-DC power converter. During the soft-start state, the voltage across the flying capacitor is adjusted to be within a threshold voltage of a voltage provided to the load. By gradually adjusting the voltage across the flying capacitor, large transient currents can be avoided when transitioning between one of the forward-charging operational modes and the reverse-charging operational mode. These large transient currents could otherwise damage one or more of the switches within the DC-to-DC power converter. When the voltage across the flying capacitor is within the threshold voltage, the DC-to-DC power converter operates in the steady state. In the steady state, the flying capacitor is connected between the load and a ground. This improves efficiency, reduces the ripple across the voltage provided at the load, and reduces variations in the voltage at the load in response to transient events.

Figure 1:
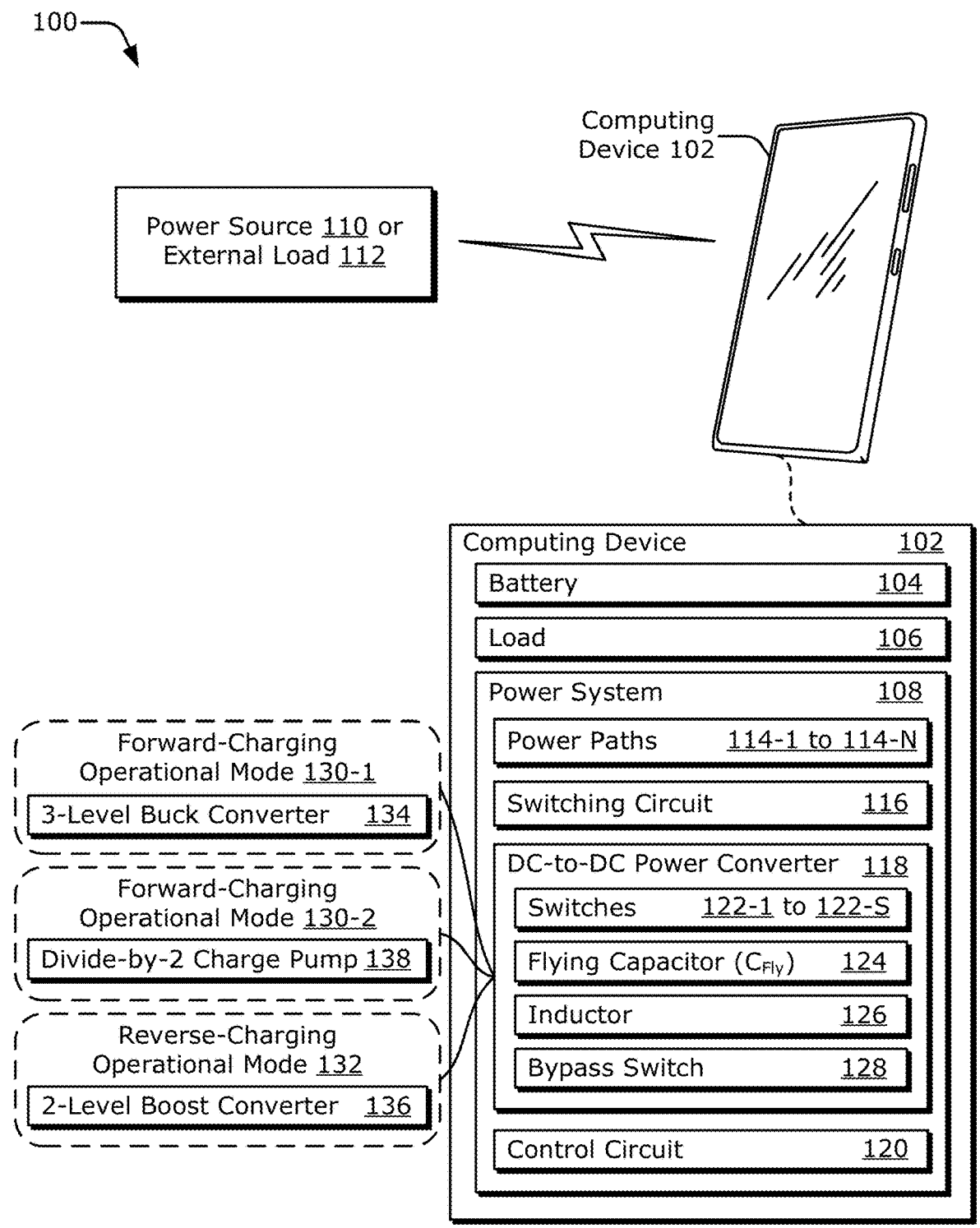
FIG. 1 illustrates an example environment in which a multi-mode DC-to-DC power converter can be implemented.

FIG. 1 illustrates an example environment 100 in which a multi-mode DC-to-DC power converter can be implemented. In the example environment 100, an example computing device 102 includes a battery 104, a load 106, and a power system 108. In some situations, the power system 108 transfers power from a power source 110 to the battery 104 or the load 106. In other situations, the power system 108 transfers power from the battery 104 to the load 106 or an external load 112.

The battery 104 can include a variety of types, including lithium-ion, lithium polymer, nickel-metal hydride, nickel-cadmium, lead-acid, and so forth. The battery 104 can include a single-cell battery or a multi-cell battery (e.g., a two-cell battery). The power source 110 can represent any type of power source, including a power outlet, a solar charger, a portable charging station, a wireless charger, another battery, and so forth. The external load 112 can represent an external peripheral, such as a headset or another computing device (e.g., another smartphone).

In this example, the computing device 102 is implemented as a smartphone. However, the computing device 102 may be implemented as any suitable computing or electronic device, such as a cellular phone, gaming device, navigation device, laptop computer, desktop computer, tablet computer, wearable device (e.g., smartwatch), Internet-of-Things (IoTs) device, smart appliance, vehicle, medical device, satellite, wireless charging device, and so forth.

The power system 108 includes two or more power paths 114-1 to 114-N, where N represents a positive integer greater than one. The power system 108 also includes at least one switching circuit 116, at least one DC-to-DC power converter 118, and at least one control circuit 120. One of the power paths 114-1 to 114-N can include a wireless power transmitter or a wireless power receiver to support wireless charging. Additionally or alternatively, another one of the power paths 114-1 to 114-N can include a power adaptor to support wired charging. The power adaptor can include a universal serial bus (USB) adaptor, for instance. In general, the power paths 114-1 to 114-N transfer power between the power source 110 or external load 112 and the switching circuit 116.

The switching circuit 116 can isolate the power paths 114-1 to 114-N from the battery 104 to prevent leakage current from flowing from the battery 104 to the power paths 114-1 to 114-N. Additionally, the switching circuit 116 can enable individual power paths 114-1 to 114-N to be connected to the DC-to-DC power converter 118 and provide isolation between the power paths 114-1 to 114-N.

In example implementations, the DC-to-DC power converter 118 includes switches 122-1 to 122-S, where S represents a positive integer. The DC-to-DC power converter 118 also includes at least one flying capacitor 124 and at least one inductor 126, as further described with respect to FIG. 3. Various implementations of the DC-to-DC power converter 118 may further include a bypass switch 128. Components of the DC-to-DC power converter 118 can be implemented on a stand-alone integrated circuit or as part of a power-management integrated circuit (PMIC), which implements additional functions.

The DC-to-DC power converter 118 implements a multi-mode DC-to-DC power converter and can thus operate according to at least one forward-charging operational mode 130-1 or 130-2 and a reverse-charging operational mode 132. During the forward-charging operational mode 130-1, the DC-to-DC power converter 118 can operate as a three-level buck converter 134 to transfer power from the power source 110 to the battery 104 or the load 106. The three-level buck converter 134 enables the DC-to-DC power converter 118 to operate with a duty cycle between zero and one. The duty cycle can be dynamically adjusted to yield a desired output voltage and output current. This flexibility enables the DC-to-DC power converter 118 to charge the battery 104 from a depleted state to a fully-charged state, for instance.

During the reverse-charging operational mode 132, the DC-to-DC power converter 118 operates as a two-level boost converter 136 to transfer power from the battery 104 to the external load 112. During the reverse-charging operational mode 132, the DC-to-DC power converter 118 can operate in a soft-start state or a steady state, as further described with respect to FIGS. 4-7.

If the DC-to-DC power converter 118 includes the bypass switch 128, the DC-to-DC power converter 118 can selectively operate as a divide-by-two charge pump 138 during the forward-charging operational mode 130-2 based on the bypass switch 128 being in the closed state. The divide-by-two charge pump 138 enables the DC-to-DC power converter 118 to operate at a higher level of efficiency at a duty cycle of approximately 0.5 relative to the three-level buck converter 134. The higher efficiency and operation of the divide-by-two charge pump 138 enables the DC-to-DC power converter 118 to quickly charge the battery 104.

The control circuit 120 controls the operational mode of the DC-to-DC power converter 118 based on a software or hardware command provided by the computing device 102 or the PMIC. In particular, the control circuit 120 generates bias voltages, which can establish different switch states, control a mode of the DC-to-DC power converter 118, and control a configuration of the switching circuit 116. By providing different bias voltages, the control circuit 120 can dynamically change the operational mode of the DC-to-DC power converter 118 as operating conditions change. The power system 108 is further described with respect to FIG. 2.

Figure 2:
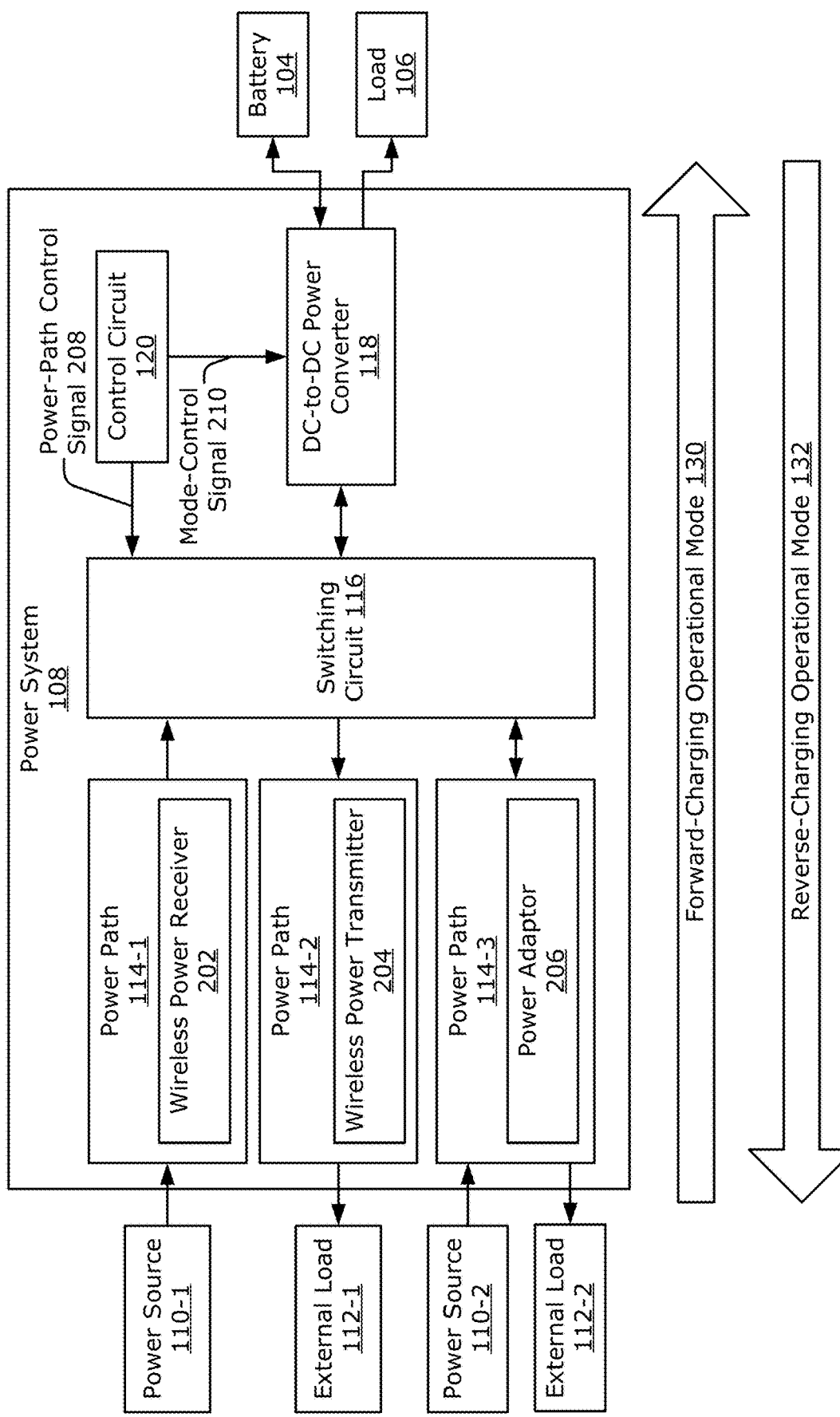
FIG. 2 illustrates an example power system that includes a multi-mode DC-to-DC power converter.

FIG. 2 illustrates an example power system 108, which includes the DC-to-DC power converter 118. In the depicted configuration, the power system 108 includes a first power path 114-1, a second power path 114-2, and a third power path 114-3. The first power path 114-1 includes a wireless power receiver 202, which can be electromagnetically coupled to a power source 110-1, such as a wireless transceiver of another device. The second power path 114-2 includes a wireless power transmitter 204, which can be electromagnetically coupled to an external load 112-1, such as a wireless receiver of another device. The third power path 114-3 includes a power adaptor 206, which can be physically connected to a power source 110-2 or an external load 112-2.

The switching circuit 116 is coupled between the power paths 114-1 to 114-3 and the DC-to-DC power converter 118, and can be implemented using one or more switches or a multiplexer. The switching circuit 116 selectively connects one of the power paths 114-1 to 114-3 to the DC-to-DC power converter 118 at a time. The DC-to-DC power converter 118 is coupled between the switching circuit 116 and the battery 104 and/or the load 106. The control circuit 120 is coupled to both the switching circuit 116 and the DC-to-DC power converter 118.

Figure 4:
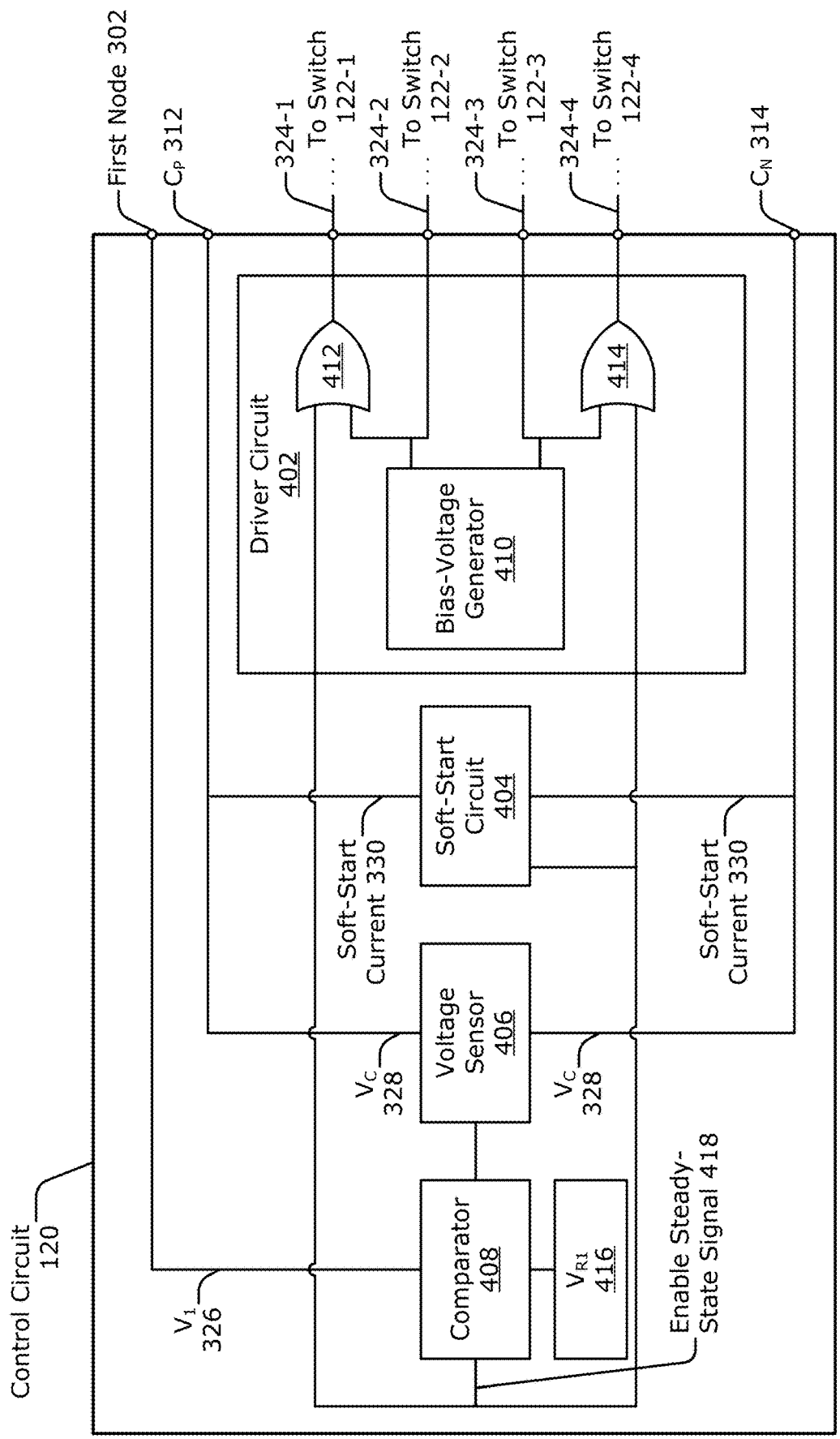
FIG. 4 illustrates an example control circuit for controlling a multi-mode DC-to-DC power converter.

During operation, the control circuit 120 generates at least one power-path control signal 208 and at least one mode-control signal 210. The power-path control signal 208 controls a state of the switching circuit 116. The switching circuit 116 connects one of the power paths 114-1 to 114-3 to the DC-to-DC power converter 118 according to the power-path control signal 208. The mode-control signal 210 controls an operational mode of the DC-to-DC power converter 118. In other words, the DC-to-DC power converter 118 operates according to one of the forward-charging operational modes 130-1 or 130-2 or the reverse-charging operational mode 132 based on the mode-control signal 210. The mode-control signal 210 can include multiple signals that are provided to respective switches within the DC-to-DC power converter 118, as shown in FIG. 4.

During one of the forward-charging operational modes 130-1 or 130-2, the power system 108 transfers power from one of the power sources 110-1 or 110-2 to either the battery 104 or the load 106. The DC-to-DC power converter 118 operates as the three-level buck converter 134 or the divide-by-two charge pump 138 based on the mode-control signal 210. During the reverse-charging operational mode 132, the power system 108 transfers power from the battery 104 to one of the external loads 112-1 or 112-2. The DC-to-DC power converter 118 operates as the two-level boost converter 136 based on the mode-control signal 210. The DC-to-DC power converter 118 is further described with respect to FIG. 3.

Figure 3:
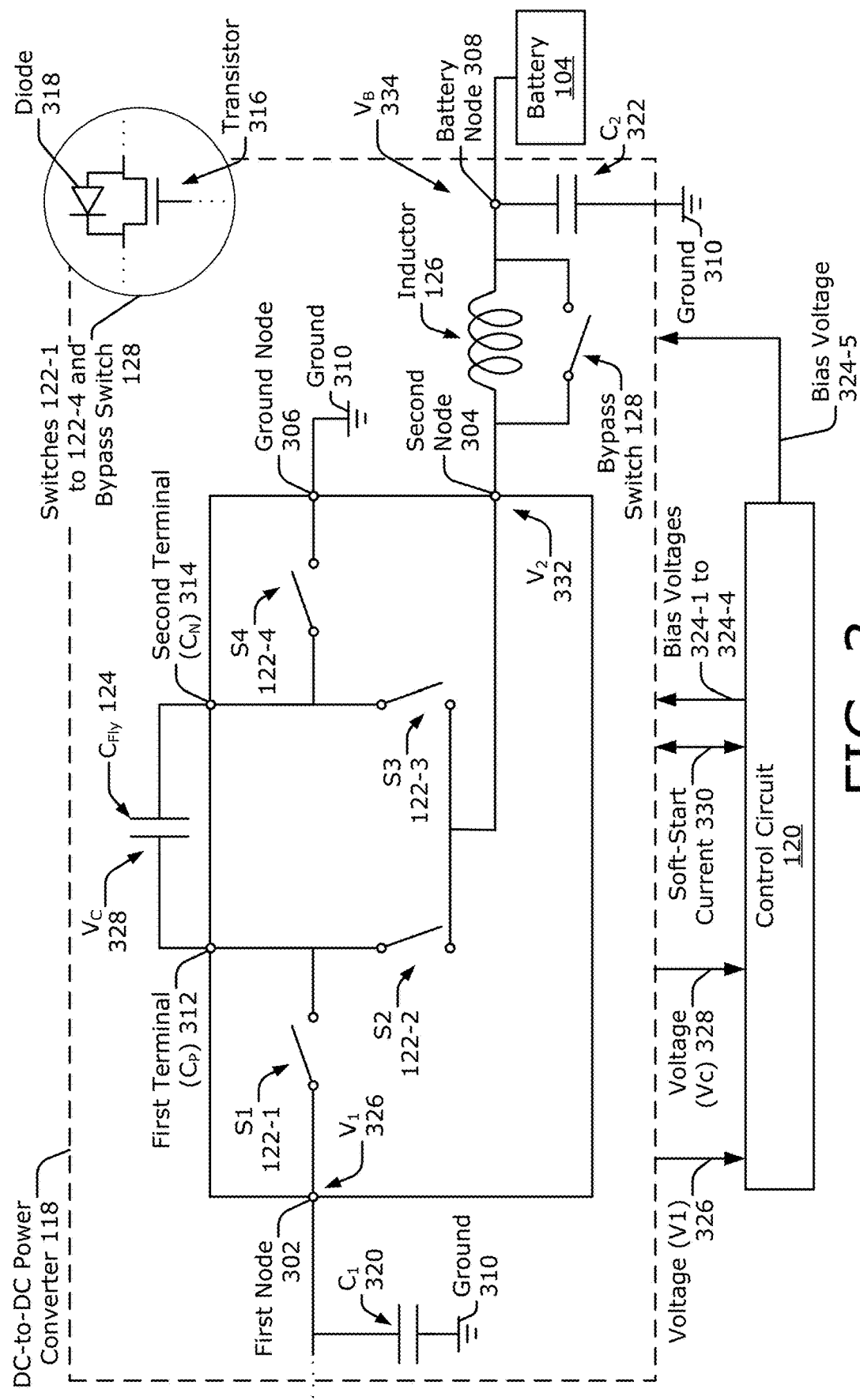
FIG. 3 illustrates an example multi-mode DC-to-DC power converter that is coupled to a control circuit and a battery.

FIG. 3 illustrates an example DC-to-DC power converter 118 coupled to the control circuit 120 and the battery 104. In the depicted configuration, the DC-to-DC power converter 118 includes the switches 122-1 to 122-4 (e.g., S equals four in this example), the flying capacitor ($C_{Fly}$) 124, the inductor 126, and the bypass switch 128. The DC-to-DC power converter 118 also includes a first node 302, a second node 304, a ground node 306, and a battery node 308. The ground node 306 is coupled to a ground 310, and the battery node 308 is coupled to the battery 104. Although not shown, the first node 302 is coupled to the switching circuit 116 of FIG. 2. In an alternative implementation that is not explicitly shown, the battery node 308 can be selectively coupled to the load 106 (of FIGS. 1 and 2) or the battery 104.

The switches 122-1 to 122-4 are coupled to the first node 302, the second node 304, the ground node 306, and the flying capacitor 124. In particular, the first switch (S1) 122-1 is coupled between the first node 302 and a first terminal ($C_P$) 312 of the flying capacitor 124. The second switch (S2) 122-2 is coupled between the first terminal 312 and the second node 304. The third switch (S3) 122-3 is coupled between a second terminal ($C_N$) 314 of the flying capacitor 124 and the second node 304. The fourth switch (S4) 122-4 is coupled between the second terminal 314 and the ground node 306.

The switches 122-1 to 122-4 can be implemented using transistors, such as metal-oxide-semiconductor field-effect transistors (MOSFETs) (e.g., n-type MOSFETs or p-type MOSFETs), junction field-effect transistors (JFETs), bipolar junction transistors (BJTs), insulated gate bipolar transistors (IGBTs), diodes, and so forth. In an example implementation, each switch 122-1 to 122-4 includes at least one transistor 316 and at least one diode 318. The diode 318 is coupled between channel terminals of the transistor 316 (e.g., coupled between a source terminal and a drain terminal). A gate terminal of the transistor 316 is coupled to the control circuit 120. In some cases, the switches 122-1 to 122-4 are implemented together on an integrated circuit.

To implement the first switch 122-1, an anode and a cathode of the associated diode 318 are respectively connected to the first terminal 312 and the first node 302. For the second switch 122-2, an anode and a cathode of the associated diode 318 are respectively connected to the second node 304 and the first terminal 312. An anode and a cathode of the diode 318 that is associated with the third switch 122-3 are respectively connected to the second terminal 314 and the second node 304. To implement the fourth switch 122-4, an anode and a cathode of the associated diode 318 are respectively connected to the ground node 306 and the second terminal 314.

The inductor 126 of the DC-to-DC power converter 118 is connected between the second node 304 and the battery node 308. Both the inductor 126 and the flying capacitor 124 store and release energy to enable power to be transferred between the first node 302 and the battery node 308.

The DC-to-DC power converter 118 can also include the bypass switch 128, which is coupled between the second node 304 and the battery node 308. In this manner, the inductor 126 and the bypass switch 128 can be connected together in parallel. Similar to the switches 122-1 to 122-4, the bypass switch 128 can be implemented using one or more transistors 316 (e.g., n-type MOSFETs or p-type MOSFETs) and one or more diodes 318.

The DC-to-DC power converter 118 also includes a first capacitor 320 and a second capacitor 322. The first capacitor ($C_1$) 320 is coupled between the first node 302 and the ground 310. The second capacitor ($C_2$) 322 is coupled between the battery node 308 and the ground 310. For each of the forward-charging operational modes 130-1 and 130-2, the first node 302 operates as an input node, and the second node 304 operates as an output node. Alternatively, for the reverse-charging operational mode 132, the second node 304 operates as the input node, and the first node 302 operates as the output node.

The control circuit 120 is connected to the switches 122-1 to 122-4 and the bypass switch 128. During operation, the control circuit 120 provides bias voltages 324-1 to 324-4 to respective gate terminals of the switches 122-1 to 122-4. Using the bias voltages 324-1 to 324-4, the control circuit 120 controls whether the switches 122-1 to 122-4 are in an open state or a closed state. The control circuit 120 also controls the timing at which the switches 122-1 to 122-4 transition between the open state and the closed state. In some cases, the control circuit 120 causes the switches 122-1 to 122-4 to alternate between the open state and the closed state according to one or more signals (e.g., clock signals) that have different phases.

The control circuit 120 also provides a bias voltage 324-5 to a gate terminal of the bypass switch 128. The bias voltage 324-5 controls whether the bypass switch 128 is in the open state or the closed state. If the bypass switch 128 is in the open state, the DC-to-DC power converter 118 can operate in the forward-charging operational mode 130-1 or the reverse-charging operational mode 132. Otherwise, if the bypass switch 128 is in the closed state, the DC-to-DC power converter 118 can operate in the forward-charging operational mode 130-2. The bias voltages 324-1 to 324-5 represent the mode-control signal 210 of FIG. 2.

The control circuit 120 can also be connected to the first terminal 312, the second terminal 314, and the first node 302. This enables the control circuit 120 to monitor a voltage ($V_1$) 326 at the first node 302 and monitor a voltage ($V_C$) 328 across the flying capacitor 124. In some cases, the control circuit 120 adjusts the voltage ($V_C$) 328 using a soft-start current 330, which flows through the control circuit 120 and the flying capacitor 124, as further described with respect to FIG. 4.

During the forward-charging operational mode 130-1, the DC-to-DC power converter 118 operates as the three-level buck converter 134 (of FIG. 1). In particular, the switches 122-1 to 122-4 operate in such a way as to cause a voltage ($V_2$) 332 at the second node 304 to selectively be at three different voltage levels. These voltage levels include the voltage ($V_1$) 326 at the first node 302 (e.g., the input voltage), half the voltage ($V_1$) 326, or the voltage at the ground 310. A voltage ($V_B$) 334 (e.g., the output voltage) at the battery node 308 can be between zero and the voltage ($V_1$) 326 depending on the duty cycle. The bypass switch 128 is in the open state to enable the inductor 126 to store and release energy during the forward-charging operational mode 130-1.

During the forward-charging operational mode 130-2, the DC-to-DC power converter 118 operates as the divide-by-two charge pump 138 (of FIG. 1). In particular, the switches 122-1 to 122-4 operate in such a way as to cause the voltage ($V_B$) 334 (e.g., the output voltage) at the battery node 308 to be equal to half the voltage ($V_1$) 326 (e.g., the input voltage). The bypass switch 128 is in the closed state to enable the inductor 126 to be bypassed during the forward-charging operational mode 130-2.

During the reverse-charging operational mode 132, the DC-to-DC power converter 118 operates as the two-level boost converter 136 (of FIG. 1). In particular, the switches 122-1 to 122-4 operate in such a way as to cause the voltage (V2) 332 to selectively be at two different voltage levels. These voltage levels include the voltage ($V_1$) 326 or the voltage at the ground 310. The voltage ($V_1$) 326 (e.g., the output voltage) at the first node 302 can be greater than or equal to the voltage ($V_B$) 334. The bypass switch 128 is in the open state to enable the inductor 126 to store and release energy during the reverse-charging operational mode 132. For this mode, the DC-to-DC power converter 118 can operate according to a soft-start state or a steady state, which are further described with respect to FIGS. 4-7.

FIG. 4 illustrates an example control circuit 120 for controlling the DC-to-DC power converter 118. The control circuit 120 includes a driver circuit 402, a soft-start circuit 404, a voltage sensor 406, and a comparator 408. The driver circuit 402 includes a bias-voltage generator 410 and logic gates 412 and 414. In the depicted configuration, the logic gates 412 and 414 implement OR gates. The driver circuit 402 is coupled to the switches 122-1 to 122-4. Using the bias-voltage generator 410 and the logic gates 412 and 414, the driver circuit 402 generates the bias voltages 324-1 to 324-4. Although not shown, the driver circuit 402 can also generate the bias voltage 324-5.

The soft-start circuit 404 is coupled to the first terminal ($C_P$) 312 of the flying capacitor 124 (of FIG. 3), the second terminal ($C_N$) 314 of the flying capacitor 124, and the comparator 408. The soft-start circuit 404 can generate the soft-start current 330 (of FIG. 3). The soft-start circuit 404 can include multiple current sources, which enables the soft-start circuit 404 to control the soft-start current 330 that flows through the flying capacitor 124 during the soft-start state. As an example, the soft-start circuit 404 can include a first pair of current sources, which are connected together at the first terminal 312, and a second pair of current sources, which are connected together at the second terminal 314. The soft-start circuit 404 can be enabled or disabled by the comparator 408, as further described below.

In FIG. 4, the voltage sensor 406 is coupled to the first terminal 312 and the second terminal 314 and can use differential sensing to measure the voltage ($V_C$) 328 across the flying capacitor 124. Alternatively, the voltage sensor 406 can be coupled to one of the terminals 312 or 314 and use single-ended sensing to measure the voltage ($V_C$) 328.

The comparator 408 is coupled to the first node 302, the voltage sensor 406, a reference voltage ($V_{R1}$) 416, the logic gates 412 and 414, and the soft-start circuit 404. The reference voltage ($V_{R1}$) can be set according to an amount of transient current that the switches 122-1 to 122-4 can reliably handle. Generally, the comparator 408 determines whether the voltage ($V_C$) 328 is sufficiently close to the voltage ($V_1$) 326 to avoid generating a large transient current that can damage the switches 122-1 to 122-4. In particular, the comparator 408 can determine whether or not an absolute value of a difference between the voltage ($V_1$) 326 and the voltage ($V_C$) 328 is less than the reference voltage ($V_{R1}$) 416. The comparator 408 can generate an enable steady-state signal 418, which causes the DC-to-DC power converter 118 to operate according to a soft-start state or the steady state.

During the soft-start state, the control circuit 120 adjusts the voltage ($V_C$) 328 across the flying capacitor 124 so that the voltage ($V_C$) 328 is within a threshold voltage from the voltage ($V_1$) 326. In particular, the comparator 408 enables the soft-start circuit 404 to increase or decrease the voltage ($V_C$) 328 across the flying capacitor 124 by controlling the soft-start current 330. In order to adjust the voltage ($V_C$) 328 without impacting the operation of the switches 122-1 to 122-4 or the performance of the DC-to-DC power converter 118, the driver circuit 402 operates the switches 122-1 and 122-4 such that at least one of the switches 122-1 and 122-4 are in the open state. This causes at least one of the terminals 312 or 314 of the flying capacitor 124 to be disconnected from the DC-to-DC power converter 118. In some situations, the switch 122-1 alternates between the open state and the closed state according to a first phase, and the switch 122-4 alternates between the open state and the closed state according to a second phase that differs by approximately 180 degrees from the first phase. This situation is further described with respect to FIG. 6. In other situations, both the switches 122-1 to 122-4 are in the open state. This situation is further described with respect to FIG. 7.

The DC-to-DC power converter 118 transitions from the soft-start state to the steady state responsive to the voltage ($V_C$) 328 being within the threshold voltage from the voltage ($V_1$) 326. During the steady state, the comparator 408 generates the enable steady-state signal 418 to have a voltage that causes the switches 122-1 and 122-4 to be in the closed state. As a result, the flying capacitor 124 is connected in parallel with the first capacitor ($C_1$) 320. This improves efficiency, reduces the ripple across the voltage provided at the load, and reduces variations in the voltage at the load in response to transient events. The enable steady-state signal 418 also disables the soft-start circuit 404. In some situations, the driver circuit 402 operates the switches 122-2 and 122-3 with different phases to maintain the voltage ($V_1$) 326 at a target reference voltage. The operations performed by the control circuit 120 during the soft-start state and the steady state are further described with respect to FIG. 5

In another implementation that is not explicitly shown, the control circuit 120 includes the driver circuit 402 but omits the soft-start circuit 404, the voltage sensor 406, or the comparator 408 (or omits multiple ones of these). In this case, the DC-to-DC power converter 118 operates according to a single state for the reverse-charging operational mode 132 (e.g., does not transition between the soft-start state and the steady state). In particular, the control circuit 120 causes the switches 122-1 and 122-2 to alternate between the open state and the closed state according to a first phase and the switches 122-3 and 122-4 to alternate between the open state and the closed state according to a second phase that differs by approximately 180 degrees from the first phase.

Figure 5:
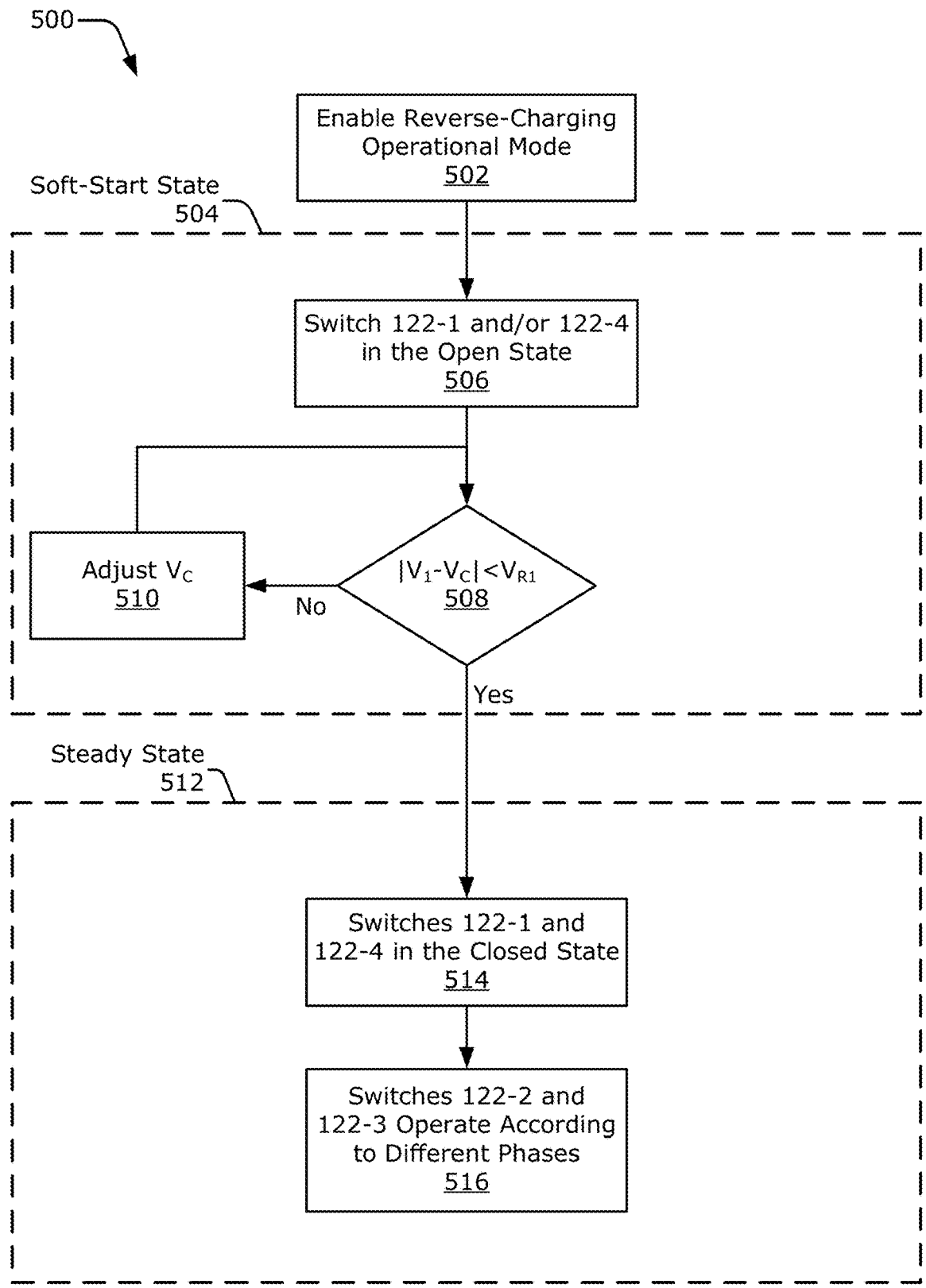
FIG. 5 illustrates an example flow diagram illustrating an example process of a control circuit.

FIG. 5 illustrates an example flow diagram 500 illustrating an example process of the control circuit 120. At 502, the control circuit 120 enables the reverse-charging operational mode 132 (of FIG. 1). This causes the DC-to-DC power converter 118 to transition from one of the forward-charging operational modes 130-1 or 130-2 to the reverse-charging operational mode 132. The control circuit 120 can enable the reverse-charging operational mode 132 based on a signal or command provided by the computing device 102.

The DC-to-DC power converter 118 enters the soft-start state 504. At 506, the driver circuit 402 (of FIG. 4) operates the switches 122-1 and 122-4 such that at least one of the switches 122-1 or 122-4 is in the open state at a time. In some situations, the switches 122-1 and 122-4 alternate between the open state and the closed state according to respective signals (e.g., bias voltages 324-1 and 324-4) with opposite phases (e.g., phases that differ by approximately 180 degrees), as further described with respect to FIG. 6. In other situations, both the switches 122-1 and 122-4 are in the open state, as further described with respect to FIG. 7.

At 508, the comparator 408 determines whether the absolute value of a difference between the voltage ($V_1$) 326 and the voltage ($V_C$) 328 is less than the reference voltage ($V_{R1}$) 416. If the condition is false, the soft-start circuit 404 is enabled and adjusts the voltage ($V_C$) 328 at 510. The process cycles between 508 and 510 until the comparator 408 determines that the condition at 508 is true. This causes the DC-to-DC power converter 118 to enter the steady-state 512 and disable the soft-start circuit 404.

At 514, the driver circuit 402 causes the switches 122-1 and 122-4 to be in the closed state. At 516, the driver circuit 402 also causes the switches 122-2 and 122-3 to alternate between the closed state and the open state according to different phases. Operations of the control circuit 120 and the DC-to-DC converter 118 during the soft-start state 504 and the steady state 512 are further described with respect to FIGS. 6 and 7.

Figure 6:
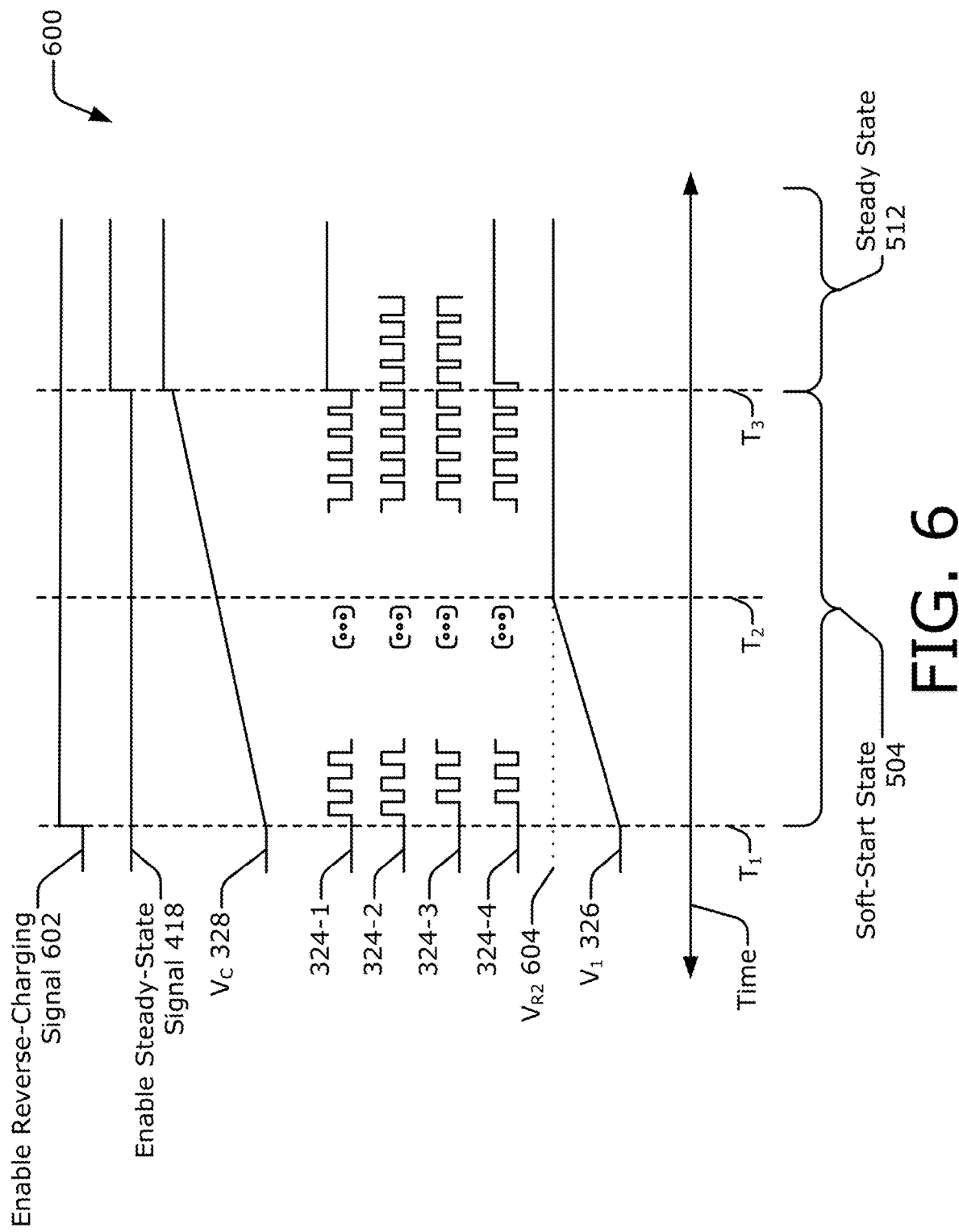
FIG. 6 illustrates an example timing diagram of signals within a multi-mode DC-to-DC power converter and control circuit.

FIG. 6 illustrates an example timing diagram 600 of signals within the DC-to-DC power converter 118 and the control circuit 120. Prior to time T1, the DC-to-DC power converter 118 operates according to one of the forward-charging operational modes 130-1 or 130-2.

At time T1, an enable reverse-charging signal 602 transitions from a low voltage to a high voltage. The high voltage causes the DC-to-DC power converter 118 to operate according to the reverse-charging operational mode 132. As an example, the enable reverse-charging signal 602 can be provided by the computing device 102 to the control circuit 120.

Also at time T1, the comparator 408 determines that the condition at 508 of FIG. 5 is false and generates the enable steady-state signal 418 to have a low voltage, which represents this determination. Values of the voltage ($V_C$) 328 and the voltage ($V_1$) 326 may not satisfy the condition at 508 due to normal operation of the forward-charging operational modes 130-1 or 130-2 or a time at which the DC-to-DC power converter 118 transitions to the reverse-charging operational mode 132. To avoid generating a large transient current, the DC-to-DC power converter 118 operates in the soft-start state 504 to adjust the voltage ($V_C$) 328. During this time, the voltage ($V_1$) 326 is also adjusted to approach a reference voltage ($V_{R2}$) 604, which represents a target output voltage for transferring power to the external load 112-1 or 112-2 (of FIG. 2).

At time T1, the driver circuit 402 generates the bias voltages 324-1 and 324-2 to have a first phase, and the bias voltages 324-3 and 324-4 to have a second phase. The second phase is approximately 180 degrees offset relative to the first phase. Due to this phase difference, the switches 122-1 and 122-2 are in the open state while the switches 122-3 and 122-4 are in the closed state. The switches 122-1 and 122-2 are also in the closed state while the switches 122-3 and 122-4 are in the open state. This switching operation charges and discharges the inductor 126 to enable power to transfer from the battery node 308 to the first node 302. The bias voltages 324-1 to 324-4 are shown to be at a low voltage or a high voltage. The low voltage causes the associated switch 122-1 to 122-4 to be in the open state and the high voltage causes the associated switch 122-1 to 122-4 to be in the closed state.

Between time T1 and time T3, the soft-start circuit 404 gradually increases the voltage ($V_C$) 328 across the flying capacitor 124. The voltage ($V_1$) 326 also increases due to the switching operation described above. At time T2, the voltage ($V_1$) 326 is approximately equal to the reference voltage ($V_{R2}$) 604. The condition at 508 of FIG. 5, however, continues to be false.

At time T3, the comparator 408 determines that the condition at 508 of FIG. 5 is true and generates the enable steady-state signal 418 to have a high voltage, which represents this determination. The enable steady-state signal 418 causes the DC-to-DC power converter 118 to operate in the steady state 512. In the steady state 512, the bias voltages 324-1 and 324-4 are set at the high voltage to cause the switches 122-1 and 122-4 to be in the closed state. The bias voltages 324-2 and 324-3 continue to cause the switches 122-2 and 122-3 to alternate between the open state and the closed state at different phases. Although not shown, the voltage ($V_2$) 332 at the second node 304 alternates between the ground 310 and the voltage ($V_1$) 326 due to the operation of the switches 122-1 to 122-4 between times T1 and T3, and after time T3. As such, the DC-to-DC power converter 118 operates as the two-level boost converter 136 (of FIG. 1) during this time period.

In FIG. 6, the voltage ($V_1$) 326 reaches the reference voltage ($V_{R2}$) 604 before the DC-to-DC power converter 118 transitions from the soft-start state 504 to the steady state 512. In a different situation not shown, the voltage ($V_1$) 326 reaches the reference voltage ($V_{R2}$) 604 before the DC-to-DC power converter 118 transitions from the soft-start state 504 to the steady state 512.

Figure 7:
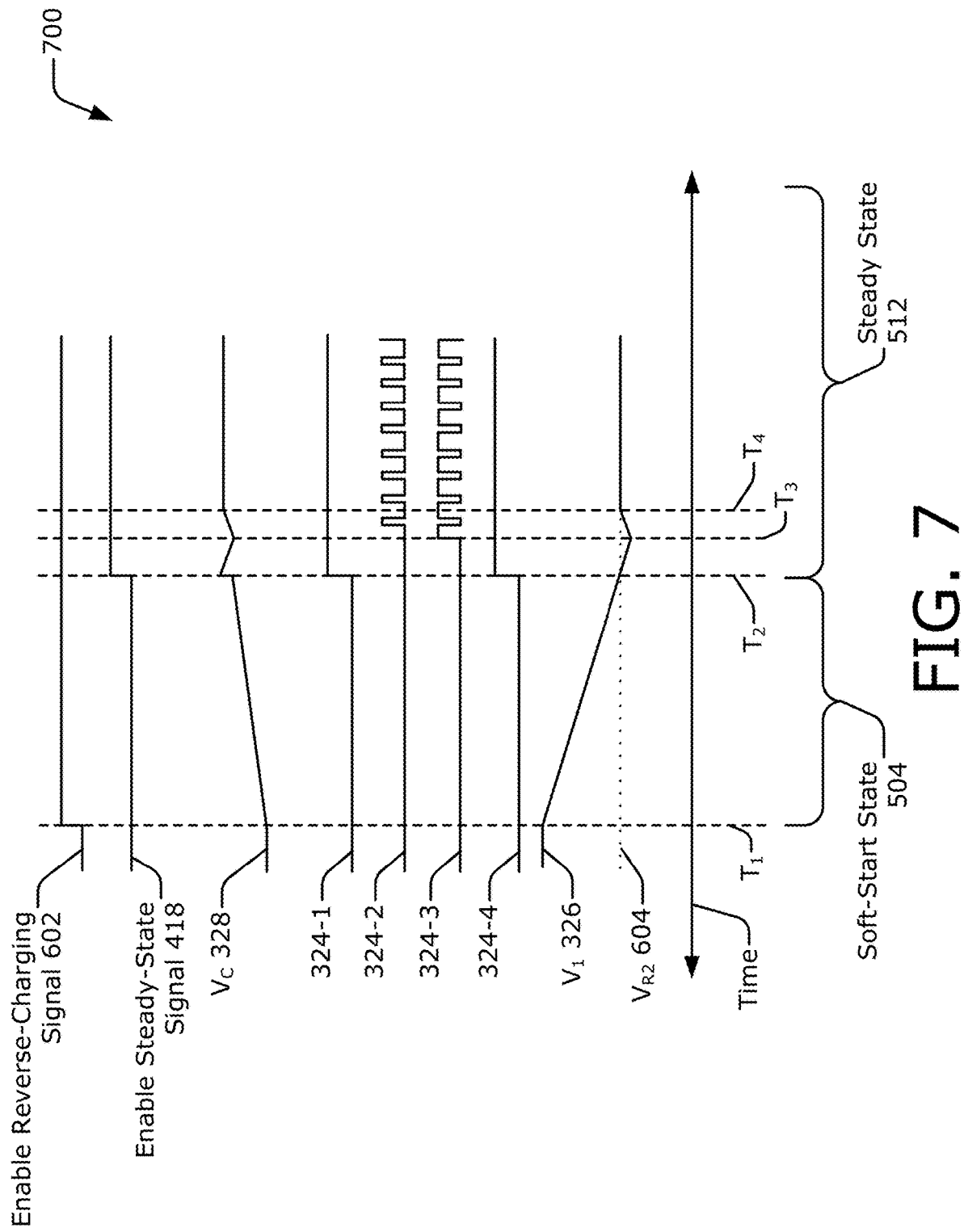
FIG. 7 illustrates another example timing diagram of signals within a multi-mode DC-to-DC power converter and control circuit.

FIG. 7 illustrates another example timing diagram 700 of signals within the DC-to-DC power converter 118 and the control circuit 120. Prior to time T1, the DC-to-DC power converter 118 operates according to one of the forward-charging operational modes 130-1 or 130-2. At time T1, the enable reverse-charging signal 602 causes the DC-to-DC power converter 118 to operate according to the reverse-charging operational mode 132.

Also at time T1, the comparator 408 determines that the condition at 508 of FIG. 5 is false and generates the enable steady-state signal 418 to have a low voltage, which represents this determination. Values of the voltage ($V_C$) 328 and the voltage ($V_1$) 326 may not satisfy the condition at 508 due to normal operation of the forward-charging operational modes 130-1 or 130-2 or a time at which the DC-to-DC power converter 118 transitions to the reverse-charging operational mode 132. To avoid generating a large transient current, the DC-to-DC power converter 118 operates in the soft-start state 504 to adjust the voltage ($V_C$) 328. During this time, the voltage ($V_1$) 326 is also adjusted to approach the reference voltage ($V_{R2}$) 604, which represents a target output voltage for transferring power to the external load 112-1 or 112-2 (of FIG. 2). In FIG. 7, the voltage ($V_1$) 326 is greater than the reference voltage ($V_{R2}$) 604 at time T1.

The driver circuit 402 operates the switches 122-1 to 122-4 to enable the voltage ($V_C$) 328 to be adjusted by the soft-start circuit 404 and enable the voltage ($V_1$) 326 to decrease. In particular, the driver circuit 402 generates the bias voltages 324-1 to 324-4 with low voltages to cause the switches 122-1 to 122-4 to be in the open state. Between time T1 and time T2, the soft-start circuit 404 adjusts the voltage ($V_C$) 328 in order to satisfy the condition at 508 of FIG. 5.

At time T2, comparator 408 determines that the condition at 508 of FIG. 5 is true and generates the enable steady-state signal 418 to have a high voltage, which represents this determination. The enable steady-state signal 418 causes the DC-to-DC power converter 118 to operate in the steady state 512 and disables the soft-start circuit 404. In the steady state 512, the bias voltages 324-1 and 324-4 are set at the high voltage to cause the switches 122-1 and 122-4 to be in the closed state.

Between time T2 and time T3, the voltage ($V_1$) 326 decreases below the reference voltage ($V_{R2}$) 604. At time T3, the driver circuit 402 generates the bias voltages 324-2 and 324-3 with different phases to cause the switches 122-2 and 122-3 to alternate between the open state and the closed state. Due to the operation of the switches 122-1 to 122-4, the voltage ($V_1$) 326 increases. At time T4, the voltage ($V_1$) 326 reaches or is approximately equal to the reference voltage ($V_{R2}$) 604.

Although not shown, the voltage ($V_2$) 332 at the second node 304 alternates between the ground 310 and the voltage ($V_1$) 326 due to the operation of the switches 122-1 to 122-4 between times T3 and T4, and after time T4. As such, the DC-to-DC power converter 118 operates as the two-level boost converter 136 (of FIG. 1) during this time period.

Figure 8:
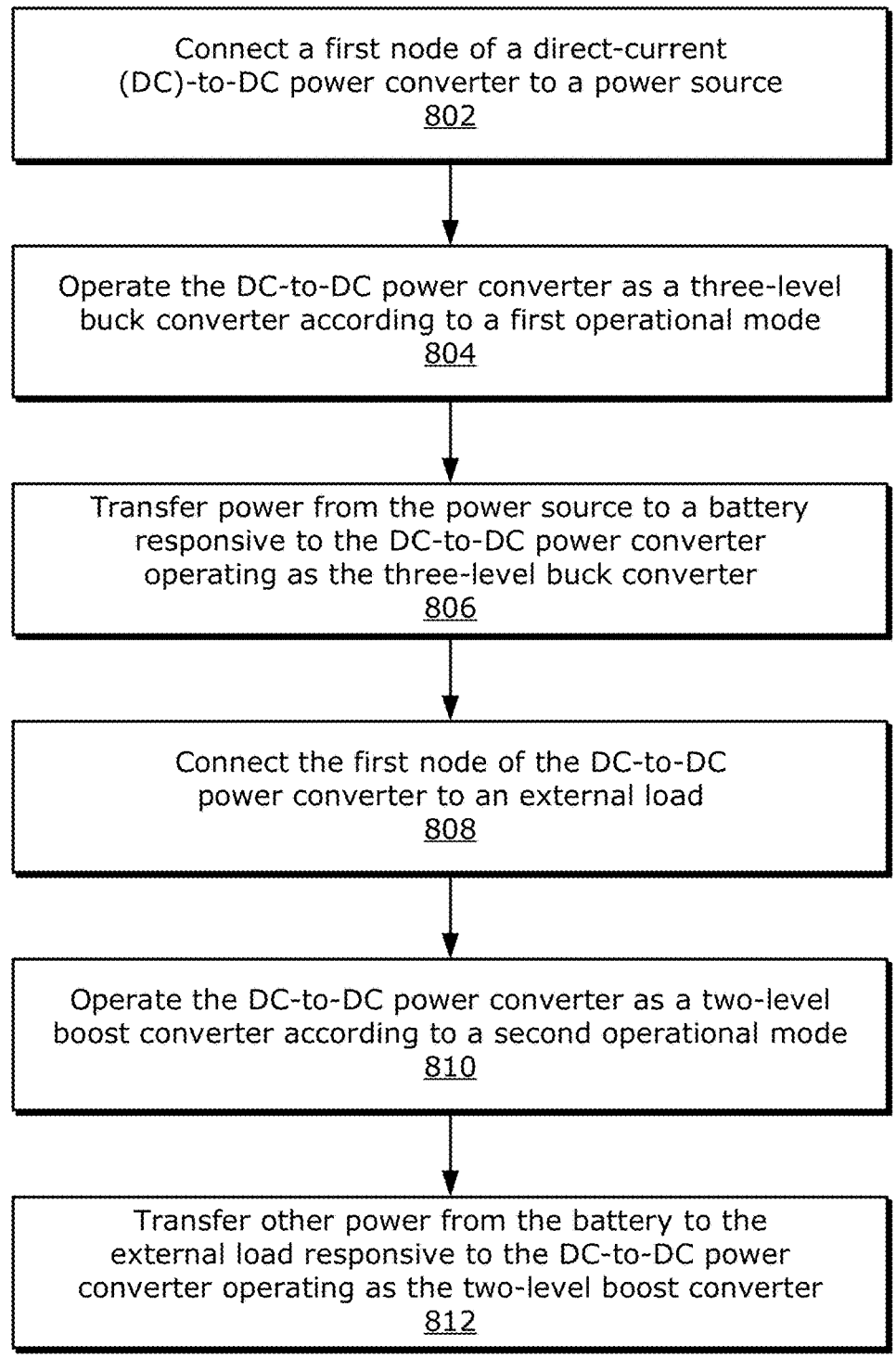
FIG. 8 is a flow diagram illustrating an example process for operating a multi-mode DC-to-DC power converter.

FIG. 8 is a flow diagram illustrating an example process 800 for operating a multi-mode DC-to-DC power converter. The process 800 is described in the form of a set of blocks 802-812 that specify operations that can be performed. However, operations are not necessarily limited to the order shown in FIG. 8 or described herein, for the operations may be implemented in alternative orders or in fully or partially overlapping manners. Also, more, fewer, and/or different operations may be implemented to perform the process 800, or an alternative process. Operations represented by the illustrated blocks of the process 800 may be performed by a power system 108 (e.g., of FIG. 1 or 2). More specifically, the operations of the process 800 may be performed, at least partially, by a DC-to-DC power converter 118, as shown in FIGS. 1 and 3.

At block 802, a first node of a DC-to-DC power converter is connected to a power source. For example, the switching circuit 116 connects the first node 302 of the DC-to-DC power converter 118 to the power source 110 (e.g., the power source 110-1 or the power source 110-2), as shown in FIG. 2.

At block 804, the DC-to-DC power converter is operated as a three-level buck converter according to a first operational mode. For example, the DC-to-DC power converter 118 operates as the three-level buck converter 134 according to the forward-charging operational mode 130-1, as shown in FIG. 1. In particular, the switches 122-1 to 122-4 (of FIG. 3) operate in such a way as to cause the voltage ($V_2$) 332 at the second node 304 to be approximately equal to the voltage ($V_1$) 326 at the first node 302 (e.g., the input voltage), half the voltage ($V_1$) 326, or the voltage at the ground 310. The voltage ($V_B$) 334 (e.g., the output voltage) at the battery node 308 can be between zero and the voltage ($V_1$) 326 (e.g., the input voltage) depending on the duty cycle. If the DC-to-DC power converter 118 includes the bypass switch 128, the bypass switch 128 is in the open state to enable the inductor 126 to store and release energy.

At block 806, power is transferred from the power source to a battery responsive to the DC-to-DC power converter operating as the three-level buck converter. For example, the power system 108 transfers power from the power source 110 to the battery 104 responsive to the DC-to-DC power converter 118 operating as the three-level buck converter 134. In an alternative implementation, the power can be transferred from the power source 110 to the load 106.

At block 808, the first node of the DC-to-DC power converter is connected to an external load. For example, the switching circuit 116 connects the first node 302 of the DC-to-DC power converter 118 to the external load 112 (e.g., the external load 112-1 or the external load 112-2), as shown in FIG. 2. This connection can include a physical connection for wired charging or electromagnetic coupling for wireless charging.

At block 810, the DC-to-DC power converter is operated as a two-level boost converter according to a second operational mode. For example, the DC-to-DC power converter 118 operates as the two-level boost converter 136 according to the reverse-charging operational mode 132, as shown in FIG. 1. In particular, the switches 122-1 to 122-4 (of FIG. 3) operate in such a way as to cause the voltage ($V_2$) 332 to be approximately equal to the voltage ($V_1$) 326 or the voltage at the ground 310. The voltage ($V_1$) 326 (e.g., the output voltage) at the first node 302 can be greater than or equal to the voltage ($V_B$) 334 (e.g., the input voltage) at the battery node 308, depending on the duty cycle. If the DC-to-DC power converter 118 includes the bypass switch 128, the bypass switch 128 is in the open state to enable the inductor 126 to store and release energy.

At block 812, other power is transferred from the battery to the external load responsive to the DC-to-DC power converter operating as the two-level boost converter. For example, the power system 108 transfers power from the battery 104 to the external load 112 responsive to the DC-to-DC power converter 118 operating as the two-level boost converter 136. In an alternative implementation, the power can be transferred a load that is internal to the computing device 102. Although not described here with reference to FIG. 8, similar operations can be performed to transition between the forward-charging operational mode 130-2 and the reverse-charging operational mode 132.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Further, items represented in the accompanying figures and terms discussed herein may be indicative of one or more items or terms, and thus reference may be made interchangeably to single or plural forms of the items and terms in this written description. Finally, although subject matter has been described in language specific to structural features or methodological operations, it is to be understood that the subject matter defined in the appended claims is not necessarily limited to the specific features or operations described above, including not necessarily being limited to the organizations in which features are arranged or the orders in which operations are performed.

What is claimed is:

1. An apparatus comprising:
a direct-current (DC)-to-DC power converter comprising:
  a first node, a second node, a battery node, and a ground node;
  a flying capacitor having a first terminal and a second terminal;
  an inductor coupled between the second node and the battery node;
  a first switch coupled between the first node and the first terminal of the flying capacitor;
  a second switch coupled between the first terminal of the flying capacitor and the second node;
  a third switch coupled between the second terminal of the flying capacitor and the second node;
  a fourth switch coupled between the second terminal of the flying capacitor and the ground node;
  a soft start circuit having a first pair of current sources connected to the first terminal of the flying capacitor and a second pair of current sources connected to the second terminal of the flying capacitor; and
wherein the DC-to-DC power converter is configured to selectively:
  transfer power from the first node to the battery node according to a first forward-charging operational mode; and
  transfer other power from the battery node to the first node according to a second reverse-charging operational mode.

2. The apparatus of claim 1, wherein the DC-to-DC power converter is configured to selectively:
  operate as a three-level buck converter according to the first forward-charging operational mode; and
  operate as a two-level boost converter according to the second reverse-charging operational mode.

3. The apparatus of claim 1, wherein:
  the DC-to-DC power converter is configured to selectively operate as a divide-by-two charge pump to transfer the power from the first node to the battery node according to a third forward-charging operational mode; and
  the DC-to-DC power converter comprises a bypass switch coupled between the second node and the battery node, the bypass switch configured to selectively be:
    in a closed state based on the third forward-charging operational mode; and
    in an open state based on the first forward-charging operational mode or the second reverse-charging operational mode.

4. The apparatus of claim 1, further comprising:
a control circuit coupled to the DC-to-DC power converter, the control circuit configured to enable the DC-to-DC power converter to transition between the first forward-charging operational mode and the second reverse-charging operational mode, wherein:

the DC-to-DC power converter comprises a capacitor coupled between the first node and a ground; and the DC-to-DC power converter is configured to selectively:

operate in a soft-start state during the second reverse-charging operational mode to adjust a voltage across the flying capacitor while at least one of the first switch or the fourth switch is in the open state; or operate in a steady state during the second reverse-charging operational mode such that the flying capacitor is connected in parallel to the capacitor.

5. The apparatus of claim 4, wherein the control circuit comprises:

a soft-start circuit coupled to the first terminal of the flying capacitor and the second terminal of the flying capacitor, the soft-start circuit configured to adjust the voltage across the flying capacitor based on a voltage at the first node, the voltage across the flying capacitor, and a reference voltage; and a driver circuit coupled to the first switch and the fourth switch, the driver circuit configured to selectively:

cause at least one of the first switch or the fourth switch to be in the open state during the soft-start state; and cause both the first switch and the fourth switch to be in a closed state during the steady state.

6. The apparatus of claim 5, wherein the control circuit comprises:

a voltage sensor coupled to the first terminal of the flying capacitor and the second terminal of the flying capacitor, the voltage sensor configured to measure the voltage across the flying capacitor; and a comparator coupled to the voltage sensor, the first node, the reference voltage, and the driver circuit, the comparator configured to cause the driver circuit to transition from operating the DC-to-DC power converter in the soft-start state to operating the DC-to-DC power converter in the steady state responsive to an absolute value of a difference between the voltage at the first node and the voltage across the flying capacitor being less than the reference voltage.

7. The apparatus of claim 5, wherein the driver circuit is coupled to the second switch and the third switch, and the driver circuit is configured to cause, responsive to the voltage at the first node being less than another reference voltage:

the first switch and the second switch to alternate between the open state and the closed state according to a first signal during the soft-start state; and the third switch and the fourth switch to alternate between the open state and the closed state according to a second signal during the soft-start state, a phase difference between the first signal and the second signal being approximately 180 degrees.

8. The apparatus of claim 5, wherein the driver circuit is configured to cause, responsive to the voltage at the first node being greater than another reference voltage, the first switch, the second switch, the third switch, and the fourth switch to be in the closed state during the soft-start state.

9. The apparatus of claim 1, wherein:

the battery node is configured to be coupled to a battery;

the ground node is configured to be coupled to a ground; and the first node is configured to be selectively coupled to:

a power source based on the DC-to-DC power converter being in the first operational forward-charging mode; and an external load based on the DC-to-DC power converter being in the second reverse-charging operational mode.

10. The apparatus of claim 1, wherein:

the battery node is configured to be selectively:

coupled to a load based on the DC-to-DC power converter being in the first forward-charging operational mode; and coupled to a battery based on the DC-to-DC power converter being in the second reverse-charging operational mode.

11. The apparatus of claim 1, wherein:

the load comprises at least one processor and a display screen; and the DC-to-DC power converter is configured to transfer the power to the at least one processor and the display screen.

* * * * *